United States Patent
Cha et al.

(10) Patent No.: US 10,468,816 B2
(45) Date of Patent: Nov. 5, 2019

(54) CONNECTOR WATERPROOF HOUSING AND MOBILE TERMINAL

(71) Applicant: LG ELECTRONICS INC., Seoul (KR)

(72) Inventors: Youngdo Cha, Seoul (KR); Jinwoo Park, Seoul (KR); Hyunsu Song, Seoul (KR); Chalkee Jung, Seoul (KR); Ikhyun Jo, Seoul (KR); Sunglyong Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/920,039

(22) Filed: Mar. 13, 2018

(65) Prior Publication Data
US 2019/0067872 A1   Feb. 28, 2019

(30) Foreign Application Priority Data

Aug. 22, 2017 (KR) .......................... 10-2017-0105969

(51) Int. Cl.
| | | |
|---|---|---|
| H01R 13/52 | (2006.01) | |
| H01R 13/516 | (2006.01) | |
| H01R 13/504 | (2006.01) | |
| H04M 1/02 | (2006.01) | |

(52) U.S. Cl.
CPC ....... *H01R 13/5219* (2013.01); *H01R 13/504* (2013.01); *H01R 13/516* (2013.01); *H01R 13/5202* (2013.01); *H04M 1/02* (2013.01); *H01R 2201/16* (2013.01)

(58) Field of Classification Search
CPC .................................................. H01R 13/5202

USPC ................................................... 439/271, 276
See application file for complete search history.

(56) References Cited

U.S. PATENT DOCUMENTS

| | | | | |
|---|---|---|---|---|
| 2010/0251780 A1* | 10/2010 | Im | .......................... | D06F 39/004 |
| | | | | 68/13 R |
| 2013/0183844 A1* | 7/2013 | Wang | ...................... | H01R 24/68 |
| | | | | 439/271 |
| 2015/0099385 A1* | 4/2015 | Ikeya | .................... | H01R 12/724 |
| | | | | 439/271 |
| 2015/0244099 A1* | 8/2015 | Lee | ....................... | H01R 13/508 |
| | | | | 439/660 |
| 2015/0270661 A1* | 9/2015 | Kao | .................... | H01R 13/5202 |
| | | | | 439/271 |

(Continued)

FOREIGN PATENT DOCUMENTS

| | | |
|---|---|---|
| JP | 2533649 | 4/1997 |
| KR | 1020140046867 | 4/2014 |

*Primary Examiner* — Tulsidas C Patel
*Assistant Examiner* — Marcus E Harcum
(74) *Attorney, Agent, or Firm* — Lee, Hong, Degerman, Kang & Waimey PC (57) ABSTRACT

There is disclosed a connector waterproof housing comprising a frame formed in a cylindrical shape having a lateral wall, an open top and an open bottom; a first waterproof portion formed in an inner rime of the lateral wall by a double-injection molding method; and a second waterproof portion formed in an outer rim of the lateral wall or one side of the frame in an ring shape so that the connector waterproof housing may solve the problem of the deteriorated waterproof reliability or the error which is caused by the pushed or rolled waterproof structure when connected with the case.

14 Claims, 8 Drawing Sheets

(56) References Cited

U.S. PATENT DOCUMENTS

| | | | |
|---|---|---|---|
| 2015/0325944 A1* | 11/2015 | Chien | H01R 13/5202 |
| | | | 439/271 |
| 2016/0043500 A1* | 2/2016 | Mori | H01R 13/504 |
| | | | 439/271 |
| 2016/0072209 A1* | 3/2016 | Triplett | H01R 12/7076 |
| | | | 439/587 |
| 2017/0250495 A1* | 8/2017 | Yudate | H01R 13/5202 |
| 2018/0287290 A1* | 10/2018 | Kifune | H01R 13/504 |
| 2018/0294598 A1* | 10/2018 | Lee | H01R 13/5219 |

* cited by examiner

CONNECTOR WATERPROOF HOUSING AND MOBILE TERMINAL

CROSS-REFERENCE TO RELATED APPLICATIONS

Pursuant to 35 U.S.C. § 119(a), this application claims the benefit of earlier filing date and right of priority to Korean Patent Application No. 10-2017-0105969, filed on Aug. 22, 2017, the contents of which are hereby incorporated by reference herein in its entirety.

BACKGROUND OF THE DISCLOSURE

Field of the Disclosure

Embodiments of the present disclosure relate to a waterproof connector housing and a mobile terminal including the same.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With the versatile uses of the mobile terminal as multimedia, more people use mobile terminals near water such as in bathrooms and swimming pools and there are increasing needs for a mobile terminal having a waterproof function.

It can be said that there is a problem or risk with a waterproof function, if a little water intrudes into a mobile terminal. Accordingly, it is important to secure the reliability of the waterproof function.

SUMMARY OF THE DISCLOSURE

Accordingly, an object of the present invention is to address the above-noted and other problems. Embodiments of the present disclosure provide a mobile terminal a waterproof connector housing and a mobile terminal including the same.

Embodiments of the present disclosure may provide a connector waterproof housing comprising a frame formed in a cylindrical shape having a lateral wall, an open top and an open bottom; a first waterproof portion formed in an inner rime of the lateral wall by a double-injection molding method; and a second waterproof portion formed in an outer rim of the lateral wall or one side of the frame in an ring shape.

The connector waterproof housing may further comprise first and second holes which are formed in the frame, wherein the first waterproof portion comprises an inlet projection fitted to the first hole; and an outlet projection fitted to the second hole.

The first waterproof portion may comprise an uneven area which is more projected inwardly than the inner lateral wall of the frame.

The second waterproof portion may be a waterproof tape.

The first waterproof portion and the second waterproof portion may be connected to one side end of the frame and made of the same material.

The frame may comprise a bent portion formed in the side end.

One end of the lateral wall may form a continuous surface and has a first portion and a second portion which are extended from the end to the other end, with a different length.

Embodiments of the present disclosure may also provide a mobile terminal comprising a case comprising a hole which is connected with internal electronic components; a connector which is exposed via the hole; a connector waterproof housing which is disposed between the connector and the case, wherein the connector waterproof housing comprises a frame formed in a cylindrical shape having a lateral wall, an open top and an open bottom; a first waterproof portion formed in an inner rime of the lateral wall by a double-injection molding method; and a second waterproof portion formed in an outer rim of the lateral wall or one side of the frame in an ring shape.

One end of the lateral wall may form a continuous surface, and the extended area of the first portion may be longer than the extended area of the second portion, and the second portion may be located in a direction toward a rear surface of the mobile terminal.

The connector may be a USB connector to which a terminal of a USB cable is connected.

According to the embodiments of the present disclosure, the connector waterproof housing in accordance with the present disclosure may solve the problem of the deteriorated waterproof reliability or the error which is caused by the pushed or rolled waterproof structure when connected with the case.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
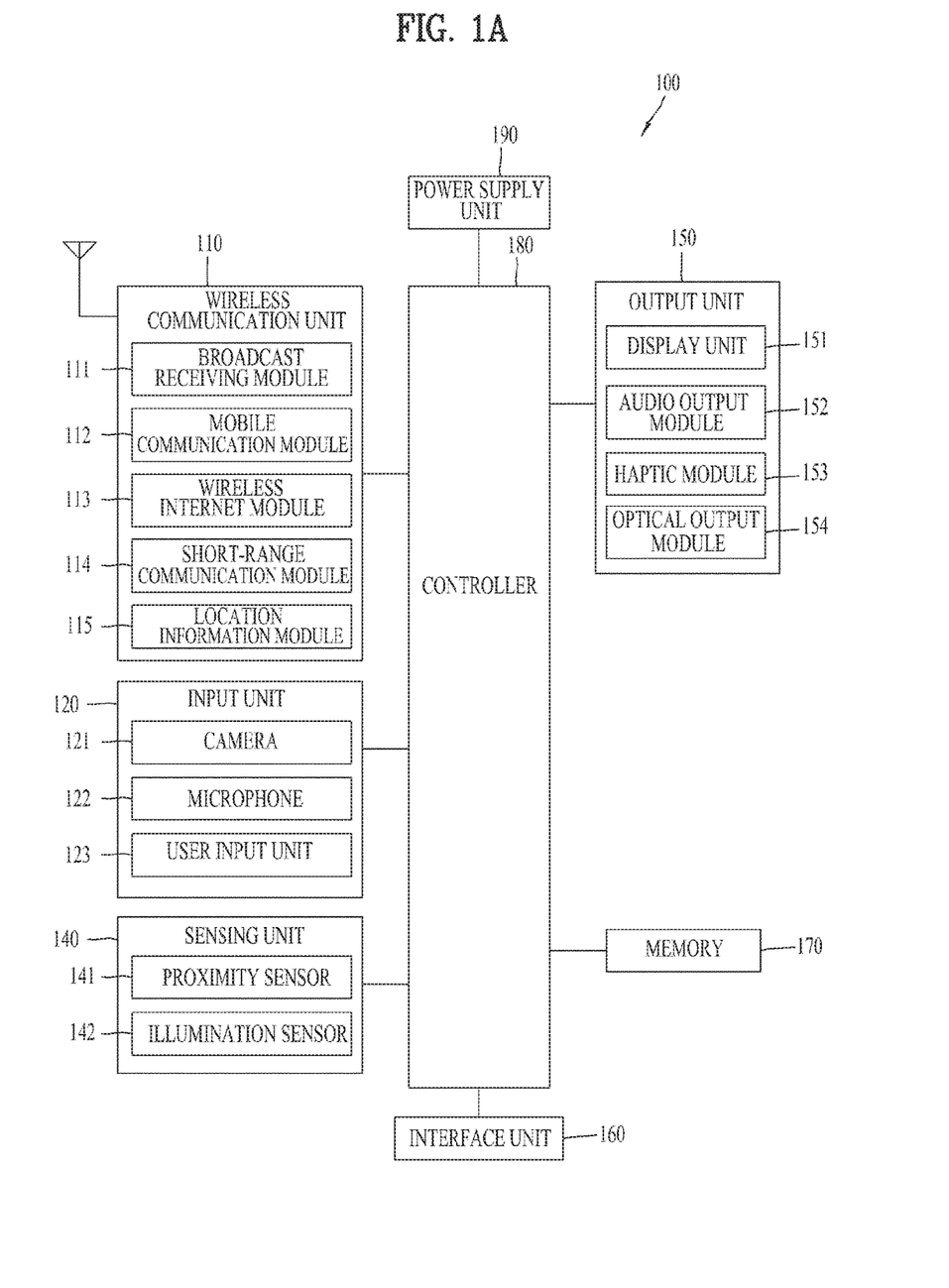
FIG. 1A is a block diagram of a mobile terminal in accordance with the present disclosure.
Figure 1B:
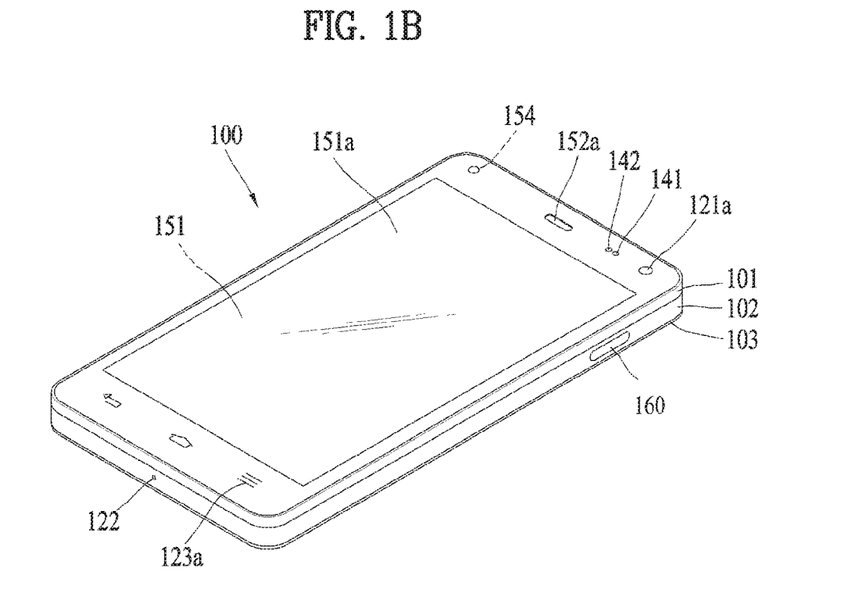
FIGS. 1B and 1C are conceptual views of one example of the mobile terminal, viewed from different directions.
Figure 1C:
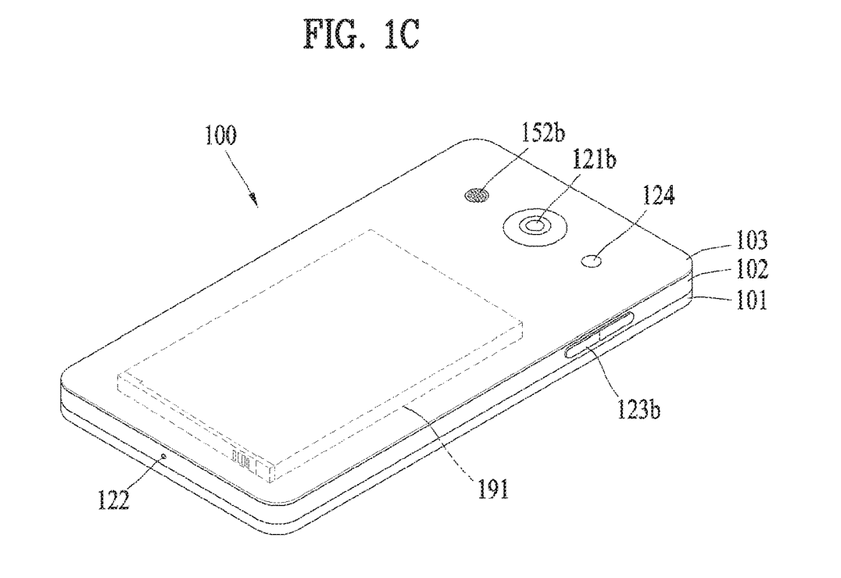

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can be also provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The interface unit for interfacing with external devices is exposed outside via a hole formed in the case 101. A USB connector 161 for inserting a USB terminal therein is exposed via a hole formed in a lateral surface of the mobile terminal as a typical example and a waterproof structure is required so as to prevent water from intruding into the mobile terminal through the hole for the USB connector 161.

Figure 7:
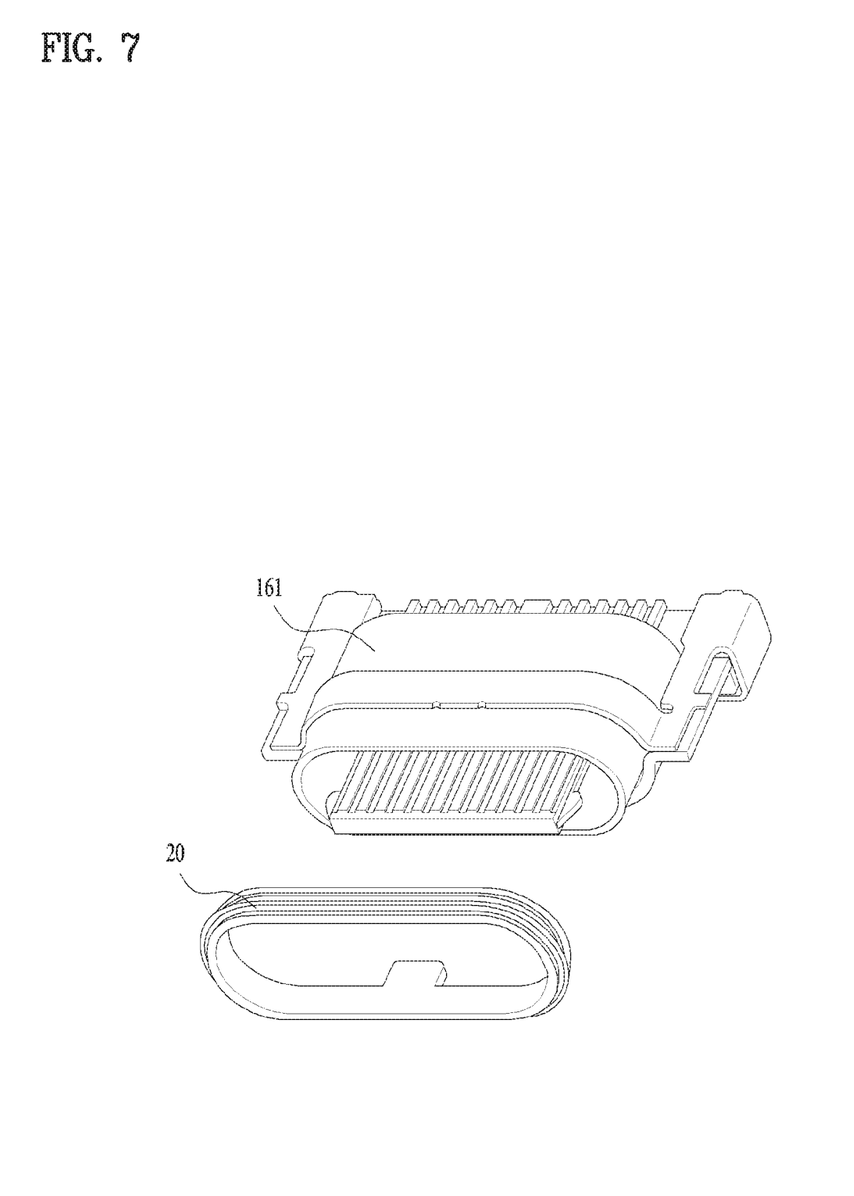
FIG. 7 is a diagram illustrating a waterproof structure of a conventional connector.

FIG. 7 is a diagram illustrating a waterproof structure of a conventional connector 161. The conventional connector 161 uses a rubber-band type O-ring inserted therein. If such an O-ring has a weak elastic force, it is difficult to insert the O-ring in the connector 161. If it has a strong elastic force, the O-ring might be pulled in coupling the connector 161 to the case 101 farther enough to form a gap and such a gap might cause a problem with the waterproof function and an error rate might become high.

To solve such the problem of the profile deformation or the pulled O-ring, a connector waterproof housing 200 having a frame 210 is provided to enhance a waterproof reliability of the connector 161.

Figure 2:
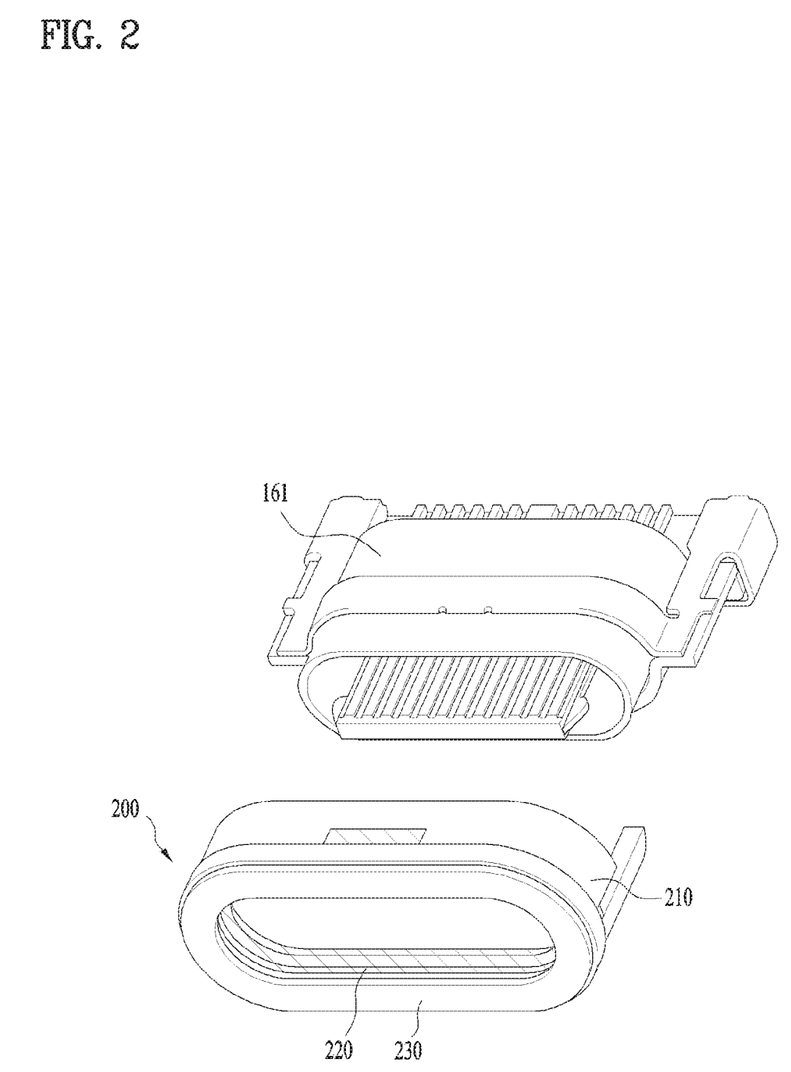
FIG. 2 is a diagram illustrating one example of a connector waterproof housing in accordance with the present disclosure.
Figure 3:
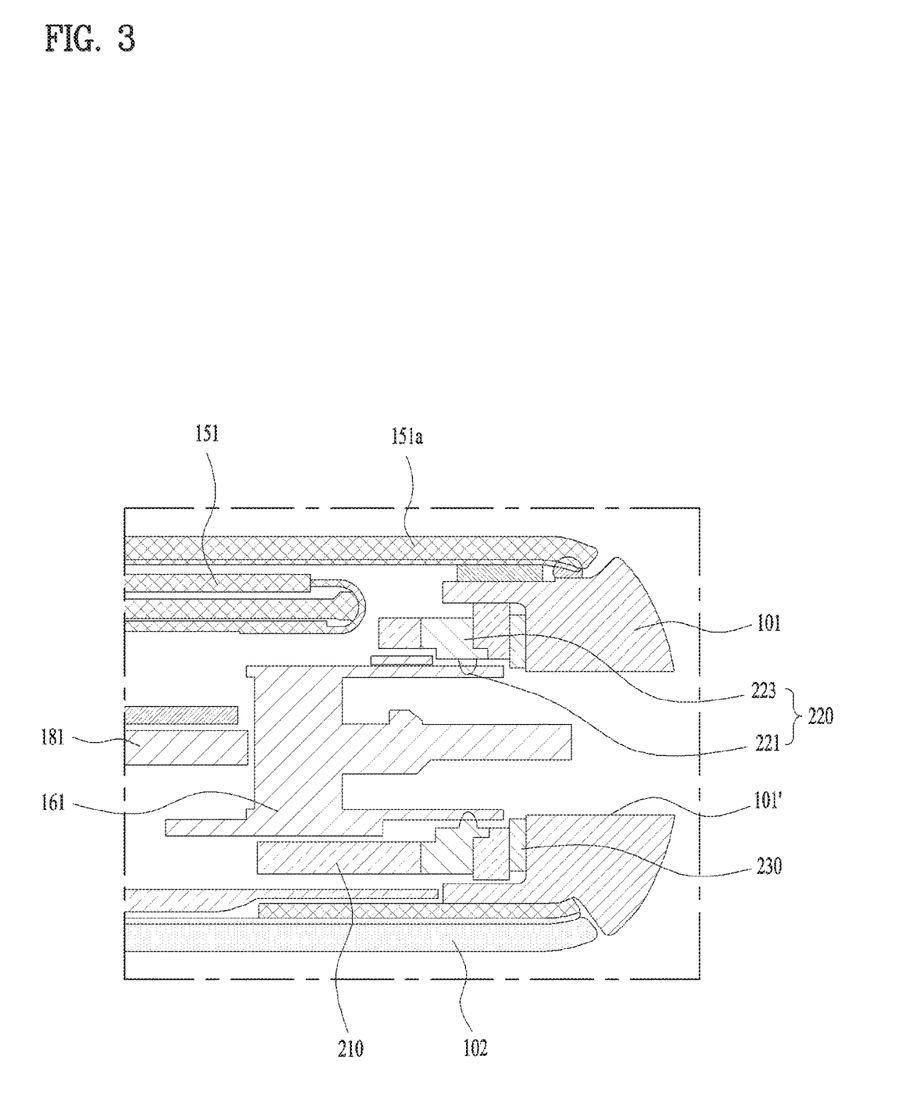
FIG. 3 is a sectional diagram illustrating a state where the connector waterproof housing of FIG. 2 is coupled to the mobile terminal.

FIG. 2 is a diagram illustrating one example of a connector waterproof housing 200 in accordance with the present disclosure and FIG. 3 is a sectional diagram illustrating a state where the connector waterproof housing 200 of FIG. 2 is coupled to the mobile terminal.

The connector waterproof housing 200 is formed in a cylinder shape having open opposite sides and the connector 161 may be insertedly fitted to the connector waterproof housing 200. As shown in FIG. 3, the connector waterproof housing 200 may be coupled to an inside of the case 101 provided in the mobile terminal and configured to prevent water from flowing into the case via the hole 101' formed in the case 101 and 102.

The connector waterproof housing 200 may include a frame 210 having rigidity; a first waterproof portion 220 attached to the connector 161 in close contact; and a second waterproof portion 230 attached to the case 101 in close contact. Plastic injection molding with rigidity or metal may be used for the frame 210. Silicon, rubber or a material having elasticity or viscosity is used for the first waterproof portion 220 and the second waterproof portion 230 to prevent water from entering a gap formed between each two components.

The connector waterproof housing 200 shown in FIG. 2 includes a frame 210 made of a plastic injection molding; an elastic first waterproof portion 220 coupled to the frame 210 by a double-injection molding method; and a second waterproof portion 230 having a viscosity component.

Figure 4:
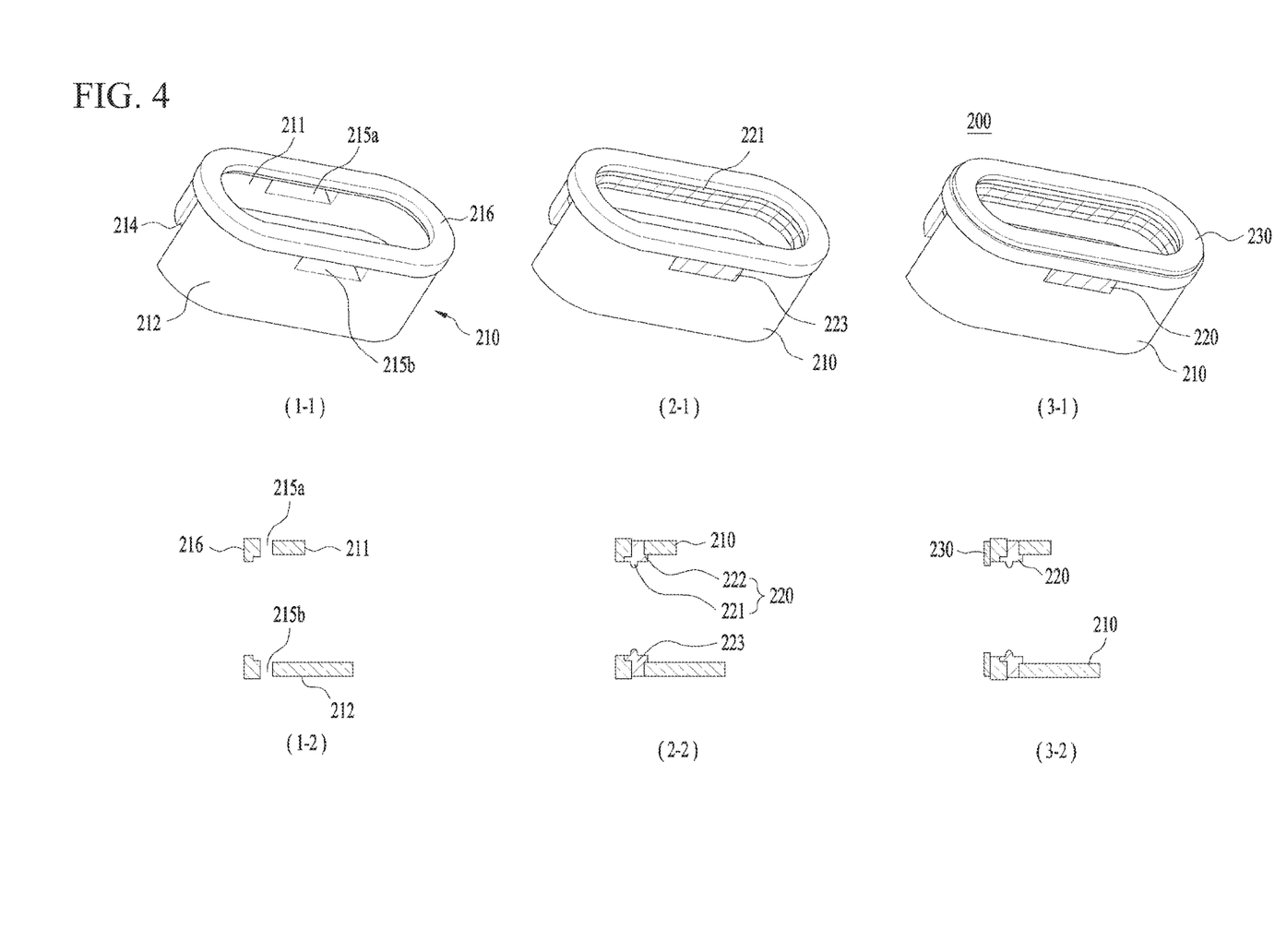
FIG. 4 is a diagram to describe a method for manufacturing the connector waterproof housing of FIG. 3.

FIG. 4 is a diagram to describe a fabricating method of the connector waterproof housing 200 shown in FIG. 2. The frame 210 is fabricated as shown in (1-1) and (1-2) of FIG. 4. The frame 210 has a cylindrical shape having an open tope, an open bottom and a lateral wall. The connector 161 is inserted inside the lateral wall so that a cross sectional area of the cylindrical frame 210 may be corresponding to the shape of the connector 161. Typically, the USB connector 161 has a rectangular or oval shape with a long horizontal length and a short vertical length.

As shown in FIG. (1-1) of FIG. 4, the lateral wall of the frame 210 has a variable length. The display unit 151 becomes large and the bezel of the lower mobile terminal portion becomes small so that the frame 210 of the connector waterproof housing 200 becomes short. Accordingly, referring to FIG. 3, a first portion configured to be located in a front surface of the mobile terminal may be formed short and a second portion 212 configured to be located in a rear portion of the mobile terminal 100 may be formed long to support the connector 161 when the user inserts the USB cable terminal in the connector 161.

As shown in FIG. (1-1) of FIG. 4, slits 214 are formed in both right and left ends and both sides of the connector 161 are inserted in the slits 214 so as to connect the connector 161 and the connector waterproof frame 210 with each other stably.

At least two holes are formed in the portion of the frame where the first waterproof portion 220 is formed. An injection-molding material for forming the first waterproof portion 220 is injected via a first hole 215a and a remnant injection molding material comes out via a second hole 215b. Accordingly, the first waterproof portion 220 has a ring shape formed along an inner rime of the frame 210 and it includes an inlet projection 222 formed in the first hole 215a; and an outlet projection 223 formed in the second hole 215b. The first hole 215a and the second hole 215b may function as the inlet hole and the outlet hole for injecting the injection molding material to form the first waterproof portion 220, while stably connecting the first waterproof portion 220 with the frame 210 at the same time.

The first waterproof portion 220 shown in (2-2) of FIG. 4 has an uneven area 221, which may include an inwardly protruding ridge, as shown in FIG. 3, which is more projected than an inner surface of the lateral wall of the frame 210. As the connector 161 is insertedly connected to the connector waterproof housing 200, the uneven area 221 is pressed and the connector 161 closely contacts with the first waterproof portion 220 to fill in the gap formed between the connector 161 and the connector waterproof housing 200.

One side of the frame 210 forms a continual surface as shown in FIG. (2-1) of FIG. 4 and then closely contacts with the inner surface of the case 101 and 102 as shown in FIG. 3. The second waterproof portion 230 is coupled to one side of the frame 210 as shown in (3-1) and (3-2) of FIG. 4. In the illustrated embodiment, the second waterproof portion 230 is a waterproof tape with viscosity. The viscosity components of the waterproof tape facilitates the close contact between the second waterproof portion 230 and the case 101 and the gap formed between the case 101 and the connector waterproof housing 200 is filled in only to prevent the water intrusion.

Figure 5:
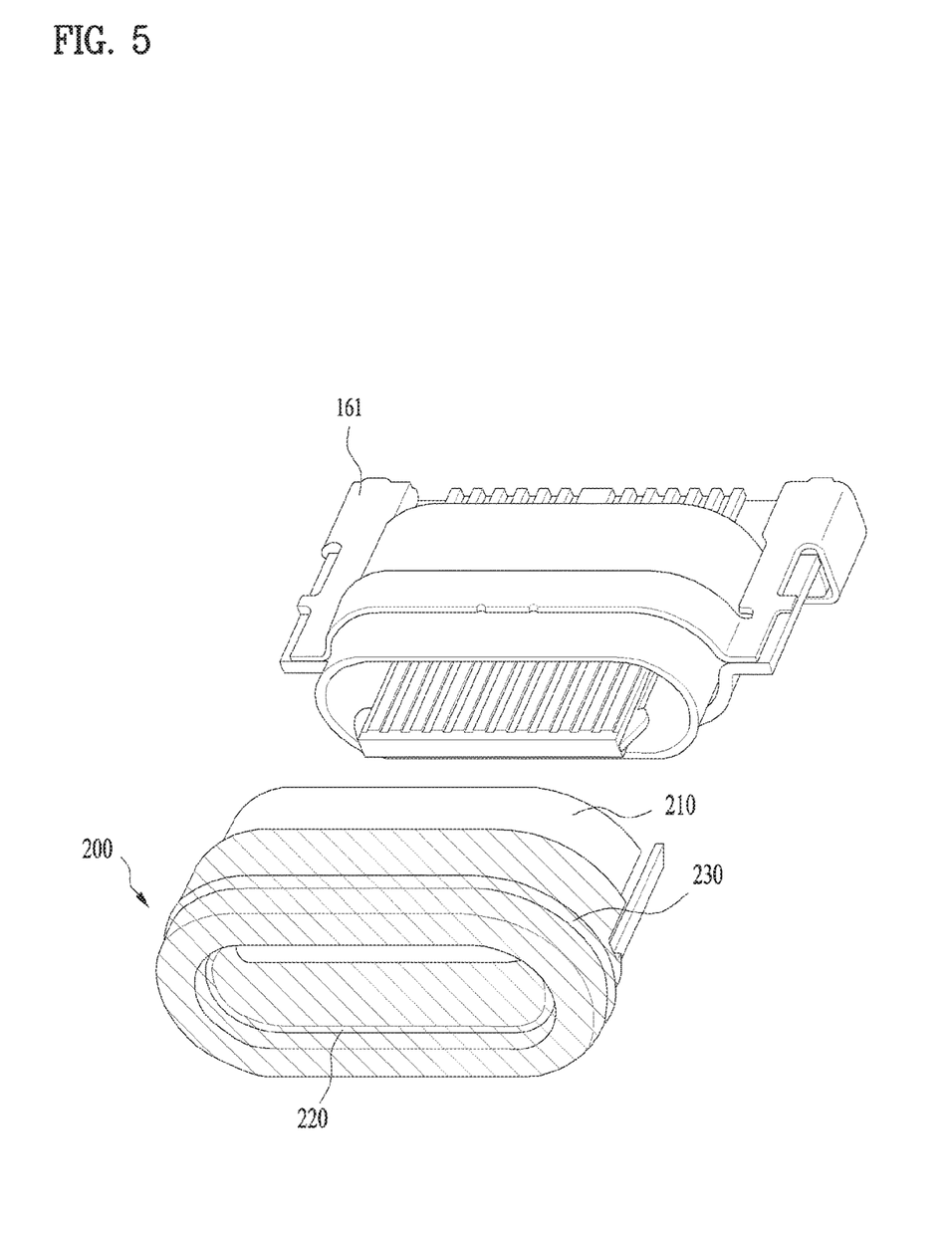
FIG. 5 is a diagram illustrating another example of the connector waterproof housing.
Figure 6:
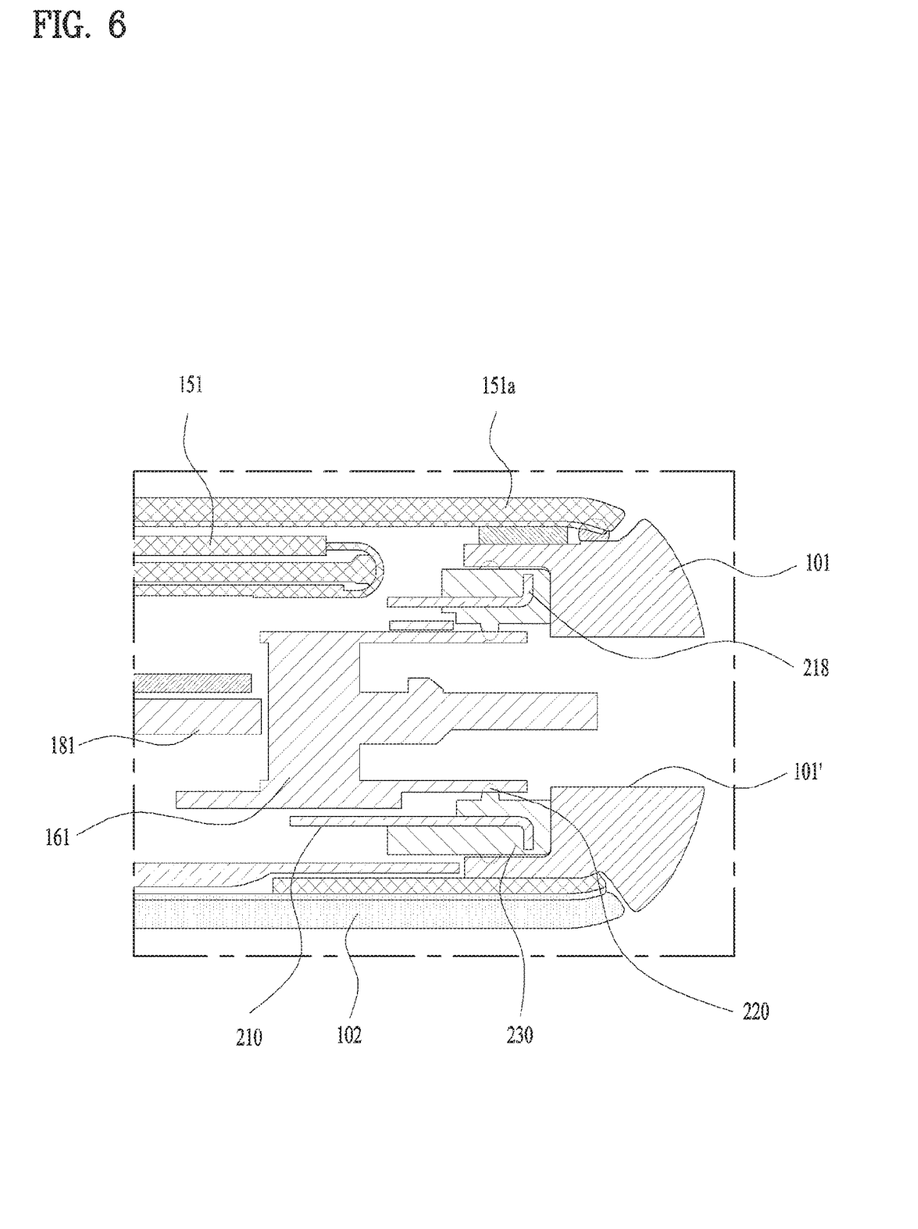
FIG. 6 is a sectional diagram illustrating a state where the connector waterproof housing of FIG. 5 is coupled to the mobile terminal.

FIG. 5 is a diagram illustrating another embodiment of the connector waterproof housing 200 in accordance with the present disclosure and FIG. 6 is a sectional diagram illustrating a state where the connector waterproof housing 200 of FIG. 5 is coupled to the mobile terminal.

In the illustrated embodiment, the first waterproof portion 220 and the second waterproof portion 230 are connected to the frame 210 and made of the same material. The first waterproof portion 220 and the second waterproof portion 230 are made of an elastic member such as silicon by a double-injection molding method simultaneously. One end of the frame 210 is connected with the first waterproof portion 220 and the second waterproof portion 230. Accordingly, this embodiment has no holes described in the above embodiment.

Without the holes, a bent portion 218 may be provided in the one end of the frame 210 to fix the first waterproof portion 220 and the second waterproof portion 230 to the frame 210 as shown in FIG. 6. The bent portion 218 is configured to prevent the first waterproof portion 220 and the second waterproof portion 230 from separating from the frame 210.

The second waterproof portion 230 is located toward the rime of the lateral wall of the frame 210, different from what is described in the embodiment. The second waterproof portion 230 includes an uneven area like the first waterproof portion 220. As the second waterproof portion 230 is located toward the lateral wall of the frame 210, the connector waterproof housing 200 might become thick. Because of that, the frame 210 may be made of metal such as SUS.

As mentioned above, the connector waterproof housing 200 may solve the problem of the deteriorated waterproof reliability or the error which is caused by the pushed or rolled waterproof structure when connected with the case 101.

Hereinafter, embodiments related with a control method which may be realized in the mobile terminal having the structure mentioned above will be described, referring to the accompanying drawings. As such, the present disclosure should be construed to extend to any alterations, equivalents and substitutes in addition to those which are particularly set out in the accompanying drawings.

A computer may include the controller 180. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A waterproof connector housing comprising:
   a cylindrical frame having a lateral wall defining a through hole;
   a first waterproof portion formed along an inner rim of the lateral wall at a first side of the frame by double-injection molding; and
   a second waterproof portion formed at an outer rim of the lateral wall at the first side of the frame, wherein the second waterproof portion is ring-shaped,
   wherein the lateral wall of the cylindrical frame comprises:
   a first lateral wall portion at a first side of the cylindrical frame; and
   a second lateral wall portion at a second side of the cylindrical frame that is opposite the first lateral wall with respect to the through hole, and
   wherein a height of the second lateral wall portion is shorter than a height of the first lateral wall portion.

2. The waterproof connector housing of claim 1, wherein:
the frame comprises first and second holes; and
the first waterproof portion comprises an inlet projection fitted to the first hole and an outlet projection fitted to the second hole.

3. The waterproof connector housing of claim 2, wherein the first and second holes are disposed at opposing locations of the lateral wall.

4. The waterproof connector housing of claim 1, wherein the first waterproof portion comprises a ridged portion which projects inwardly from the inner rim of the lateral wall.

5. The waterproof connector housing of claim 1, wherein the second waterproof portion is waterproof tape.

6. The waterproof connector housing of claim 1, wherein the first waterproof portion and the second waterproof portion are integrally formed and made of the same material and secured to the first side of the frame.

7. The waterproof connector housing of claim 6, wherein:
the frame comprises a bent portion formed at the first side of the frame; and
the bent portion is configured to secure the integrally formed first waterproof portion and second waterproof portion to the frame.

8. A mobile terminal comprising:
a case comprising a hole formed at a side of the case;
a display unit disposed at a front of the case;
a connector electrically connected to internal electronic components of the mobile terminal, wherein the connector is exposed via the hole;
a waterproof connector housing which is disposed between the connector and the case, wherein the waterproof connector housing comprises:
a cylindrical frame having a lateral wall defining a through hole configured to accommodate the connector;
a first waterproof portion formed along an inner rim of the lateral wall at a first side of the frame by double-injection molding; and
a second waterproof portion formed at an outer rim of the lateral wall at the first side of the frame, wherein the second waterproof portion is ring-shaped,
wherein the lateral wall of the cylindrical frame comprises:
a first lateral wall portion disposed toward a rear of the case with respect to the through hole; and
a second lateral wall portion that is opposite the first lateral wall with respect to the through hole, and
wherein a height of the second lateral wall portion is shorter than a height of the first lateral wall portion.

9. The mobile terminal of claim 8, wherein:
the frame comprises first and second holes; and
the first waterproof portion comprises an inlet projection fitted to the first hole and an outlet projection fitted to the second hole.

10. The mobile terminal of claim 9, wherein the first and second holes are disposed at opposing locations of the lateral wall.

11. The mobile terminal of claim 8, wherein the first waterproof portion comprises a ridged portion which projects inwardly from the inner rim of the lateral wall.

12. The mobile terminal of claim 8, wherein the second waterproof portion is waterproof tape.

13. The mobile terminal of claim 8, wherein the first waterproof portion and the second waterproof portion are integrally formed and made of the same material and secured to the first side of the frame.

14. The mobile terminal of claim 13, wherein:
the frame comprises a bent portion formed at the first side of the frame; and
the bent portion is configured to secure the integrally formed first waterproof portion and the second waterproof portion to the frame.

* * * * *